(12) United States Patent
Ebner et al.

(10) Patent No.: US 7,919,161 B2
(45) Date of Patent: Apr. 5, 2011

(54) DUAL-OVENABLE, HEAT-SEALABLE PACKAGING TRAY

(75) Inventors: Cynthia Louise Ebner, Greer, SC (US); Arthur Leroy Berrier, Simpsonville, SC (US)

(73) Assignee: Cryovac, Inc., Duncan, SC (US)

( * ) Notice: Subject to any disclaimer, the term of this patent is extended or adjusted under 35 U.S.C. 154(b) by 2199 days.

(21) Appl. No.: 10/322,896

(22) Filed: Dec. 18, 2002

(65) Prior Publication Data

US 2004/0121049 A1    Jun. 24, 2004

(51) Int. Cl.
*B32B 1/02*    (2006.01)
*B32B 1/08*    (2006.01)

(52) U.S. Cl. ............... 428/35.7; 428/34.1; 428/34.2; 428/35.9; 428/474.4; 428/474.7; 428/474.9

(58) Field of Classification Search ............... 428/34.1, 428/34.2, 35.7, 35.9, 474.4, 474.7, 474.9
See application file for complete search history.

(56) References Cited

U.S. PATENT DOCUMENTS

| | | | |
|---|---|---|---|
| 3,369,911 A | 2/1968 | Von Witzleben | 138/418.1 |
| 3,762,986 A | 10/1973 | Bhuta et al. | 428/474.7 |
| 3,843,479 A * | 10/1974 | Matsunami et al. | 428/220 |
| 3,995,084 A | 11/1976 | Berger et al. | 428/355 |
| 4,355,721 A | 10/1982 | Knott, II et al. | 206/524.2 |
| 4,400,429 A | 8/1983 | Barlow et al. | 428/379 |
| 4,421,823 A | 12/1983 | Theisen et al. | 428/349 |
| 4,448,792 A | 5/1984 | Schirmer | 426/113 |
| 4,495,249 A | 1/1985 | Ohya et al. | 428/516 |
| 4,537,305 A | 8/1985 | Takanashi | 206/438 |
| 4,542,075 A | 9/1985 | Schirmer | 428/516 |
| 4,568,922 A | 2/1986 | Schwippert et al. | 340/582 |
| 4,605,460 A | 8/1986 | Schirmer | 156/229 |
| 4,606,922 A | 8/1986 | Schirmer | 426/412 |
| 4,647,483 A | 3/1987 | Tse et al. | 428/35 |
| 4,665,135 A | 5/1987 | Tse et al. | 525/432 |
| 4,766,018 A | 8/1988 | Hinrichsen et al. | 428/35 |
| 4,803,122 A | 2/1989 | Schirmer | 428/349 |
| 4,855,103 A | 8/1989 | Ekbom | 428/345 |
| 4,855,183 A | 8/1989 | Oberle | 419/26 |
| 4,877,684 A | 10/1989 | Shepard et al. | 428/475.8 |
| 4,892,765 A | 1/1990 | Hisazumi et al. | 428/34.8 |
| 4,925,685 A | 5/1990 | Sahi | 426/123 |
| 4,935,272 A | 6/1990 | Leboeuf | 428/35.7 |
| 4,937,112 A | 6/1990 | Schirmer | 428/34.3 |
| 4,970,113 A | 11/1990 | Yamada | 428/323 |
| 5,016,735 A | 5/1991 | Hodge | 182/223 |
| 5,037,683 A | 8/1991 | Schirmer | 428/36.7 |
| 5,061,532 A | 10/1991 | Yamada | 428/35.7 |

(Continued)

FOREIGN PATENT DOCUMENTS

DE    199 35 324    2/2001

(Continued)

*Primary Examiner* — Marc A Patterson
(74) *Attorney, Agent, or Firm* — Daniel B. Ruble

(57) ABSTRACT

A dual-ovenable tray useful for supporting a food product. The tray comprises a sheet having first and second layers comprising one or more polyamides. The first layer of the sheet forms the tray inside surface. Where the first layer has a melting point, the second layer has a melting point of at least about 210° C. and at least 20° C. greater than the melting point of the first layer. Where the first layer has a glass transition temperature of less than about 120° C. measured at a 50% relative humidity, the second layer has a melting point of at least about 210° C.

52 Claims, 3 Drawing Sheets

U.S. PATENT DOCUMENTS

| | | | |
|---|---|---|---|
| 5,089,073 A | 2/1992 | Schirmer | 156/244.11 |
| 5,185,189 A | 2/1993 | Stenger et al. | 428/34.8 |
| 5,206,309 A | 4/1993 | Altman | 525/432 |
| 5,281,360 A | 1/1994 | Hong et al. | 252/188.28 |
| 5,314,987 A | 5/1994 | Kim et al. | 528/289 |
| 5,374,459 A | 12/1994 | Mumpower et al. | 428/36.7 |
| 5,460,878 A | 10/1995 | Hostetter | 428/349.1 |
| 5,462,756 A | 10/1995 | Raines et al. | 426/129 |
| 5,480,690 A | 1/1996 | Stenger et al. | 428/34.8 |
| 5,534,277 A | 7/1996 | Ramesh et al. | 426/129 |
| 5,547,765 A | 8/1996 | Degrassi et al. | 428/474.7 |
| 5,709,915 A | 1/1998 | Tomic et al. | 428/35.2 |
| 5,718,101 A * | 2/1998 | Noel et al. | 53/432 |
| 5,866,214 A | 2/1999 | Ramesh | 428/34.8 |
| 5,866,649 A | 2/1999 | Hong et al. | 524/538 |
| 5,926,989 A | 7/1999 | Oliver, Sr. | 42/70.11 |
| 6,110,600 A | 8/2000 | Ramesh | 428/476.5 |
| 6,221,410 B1 | 4/2001 | Ramesh et al. | 426/105 |
| 6,239,210 B1 | 5/2001 | Kim et al. | 524/538 |
| 6,270,882 B1 * | 8/2001 | Eggers et al. | 428/213 |
| 6,288,161 B1 | 9/2001 | Kim et al. | 524/538 |
| 6,346,285 B1 | 2/2002 | Ramesh | 426/105 |
| 6,416,832 B1 | 7/2002 | Uehara et al. | 428/34.8 |
| 6,436,547 B1 | 8/2002 | Toft et al. | 428/474.4 |
| 6,627,324 B1 | 9/2003 | Eggers et al. | 428/475.5 |
| 2002/0001684 A1 | 1/2002 | Kim et al. | 428/35.7 |
| 2003/0134966 A1 | 7/2003 | Kim et al. | 524/538 |

FOREIGN PATENT DOCUMENTS

| | | |
|---|---|---|
| EP | 0 366 382 A1 | 10/1988 |
| EP | 0 315 409 | 5/1989 |
| EP | 0 338 488 | 10/1989 |
| EP | 0 231 663 B1 | 10/1990 |
| EP | 0 795 482 A1 | 9/1997 |
| EP | 0 960 903 A2 | 12/1999 |
| WO | 92/15641 | 9/1992 |
| WO | 93/01108 | 1/1993 |
| WO | 97/04959 | 2/1997 |
| WO | 97/12758 | 4/1997 |
| WO | 97/28047 | 8/1997 |
| WO | 98/06574 A | 2/1998 |
| WO | 99/33653 | 7/1999 |
| WO | 01/89830 A1 | 11/2001 |
| WO | 02/072347 A2 | 9/2002 |

* cited by examiner

DUAL-OVENABLE, HEAT-SEALABLE PACKAGING TRAY

BACKGROUND OF THE INVENTION

The present invention relates to trays, for example, dual-ovenable, heat-sealable, food-packaging trays.

Packaging that can withstand exposure to the heating and/or cooking environment of a selected type of oven is said to be "ovenable" with respect to that type of oven. To be ovenable with respect to a microwave oven, the packaging should not, for example, include materials such as metals that reflect microwaves to cause arcing or otherwise damage the oven's microwave generation. To be ovenable with respect to a conventional oven, the packaging should, for example, be able in use to withstand exposure to 400° F. air temperature for up to four hours. Packaging that is ovenable both with respect to a microwave oven and a conventional oven is said to be "dual-ovenable."

Food packaging may be formed by heat sealing a thermoplastic film lid to a tray supporting the food. This heat sealing operation typically occurs at the food packager's plant using a heat sealing machine designed for high speed operation. Although there are several variations, generally a heat sealing machine includes a heated seal bar that contacts and compresses the lid with a flange of the tray to heat seal them together.

Three variables are important in forming a heat seal: 1) the seal bar temperature, 2) the dwell time, and 3) the sealing pressure. The seal bar temperature is the surface temperature of the seal bar. The dwell time is the length of time that the heated seal bar contacts the lid film to transfer heat from the seal bar to soften at least a portion of the lid. The sealing pressure is the amount of force that squeezes the lid and tray together during this heat transfer. All of these variables interact in completing a successful heat seal.

Because the heat sealing layers of many thermoplastic packaging films used in food packaging are based on relatively low-melting polyolefin thermoplastics (or similar melt-temperature thermoplastics), the heat sealing machines present in food packaging plants are often designed and set to operate with a seal bar temperature, a dwell time, and a sealing pressure in a range useful for such materials. This permits the heat sealing machines to operate at high speeds to form strong seals.

However, such films with polyolefin-based sealant layers generally would not be able to form heat seals that are ovenable in conventional ovens because the relatively low-melting polyolefin layer would melt, decompose, or delaminate upon exposure to a 400° F. conventional oven for normal cooking conditions of up to four hours.

It would be desirable to be able to form a heat seal between a lid film and a tray at "polyolefin-type" of heat-seal conditions, yet have a heat seal that is dual-ovenable (e.g., would be maintained upon exposure to conventional oven conditions). It would be convenient for consumers to be able to place a packaged food comprising a lid film heat sealed to a tray directly into a microwave or conventional oven to heat or cook the food without first having to remove the packaging. The consumer would thus avoid having to handle the raw product or to clean a container in which the food would have otherwise been placed for cooking or heating. The consumer would also simply be able to dispose of the packaging material after heating or cooking the food.

SUMMARY OF THE INVENTION

The present invention addresses one or more of the aforementioned problems. In a first embodiment, a tray useful for supporting a food product comprises a base having a thickness of at least about 15 mils. One or more walls extends from the base. The base and the one or more walls define a tray inside surface adapted for supporting the food product. The base and the one or more walls comprise a sheet. The sheet comprises a first layer comprising one or more polyamides and a second layer comprising one or more polyamides. The first layer of the sheet forms the tray inside surface and the first layer has a melting point. The second layer of the sheet has a melting point of at least about 210° C. and at least 20° C. greater than the melting point of the first layer.

In a second embodiment, a tray useful for supporting a food product comprises a base having a thickness of at least about 15 mils. One or more walls extending from the base. The base and the one or more walls define a tray inside surface adapted for supporting the food product. The base and the one or more walls comprise a sheet. The sheet comprises a first layer comprising one or more polyamides and a second layer comprising one or more polyamides. The first layer of the sheet forms the tray inside surface. The first layer has a glass transition temperature of less than about 120° C. measured at a 50% relative humidity. The second layer has a melting point of at least about 210° C.

In a third embodiment, a package for packaging a food product comprises a base sheet having a thickness of at least about 15 mils. The base sheet defines a food side surface for supporting the food product. The base sheet comprises a first layer comprising one or more polyamides and a second layer comprising one or more polyamides. The first layer of the base sheet forms the food side surface. The first layer has a melting point. The second layer has a melting point of at least about 210° C. and at least 20° C. greater than the melting point of the first layer. A lid film is sealed to selected areas of the food side surface of the base sheet to form a closed package. The lid film has a thickness of less than about 15 mils and comprises at least about 70% by weight of the film of one or more polyamides.

In a fourth embodiment, a package for packaging a food product comprises a base sheet having a thickness of at least about 15 mils. The base sheet defines a food side surface for supporting the food product. The base sheet comprises a first layer comprising one or more polyamides and a second layer comprising one or more polyamides. The first layer of the base sheet forms the food side surface. The first layer has a glass transition temperature of less than about 120° C. measured at a 50% relative humidity. The second layer has a melting point of at least about 210° C. The lid film is sealed to selected areas of the food side surface of the base sheet to form a closed package. The lid film has a thickness of less than about 15 mils and comprises at least about 70% by weight of the film of one or more polyamides.

These and other objects, advantages, and features of the invention will be more readily understood and appreciated by reference to the detailed description of the invention and the drawings.

DETAILED DESCRIPTION OF THE INVENTION

Figure 4:
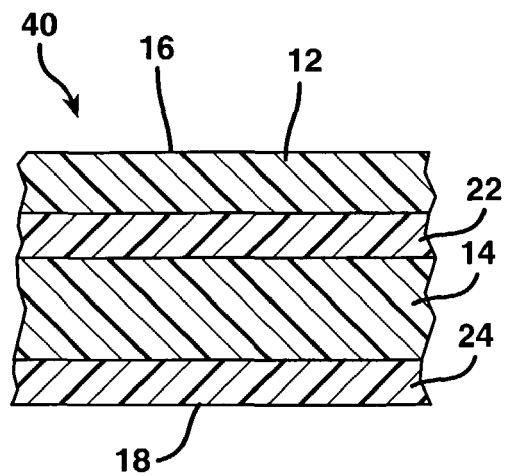
FIG. 4 is a representational cross-section of a sheet of the present invention having at least four layers.
Figure 5:
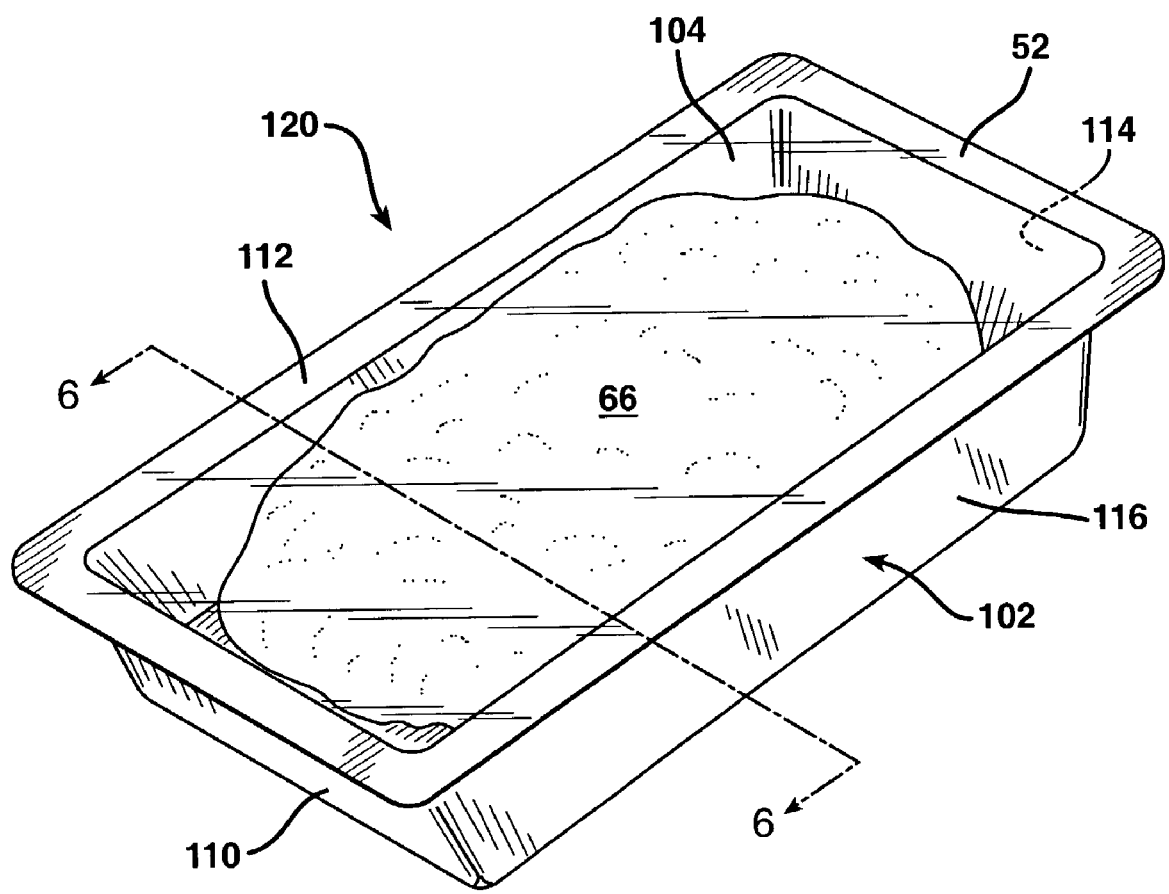
FIG. 5 is a perspective view of a package comprising a tray of the present invention.
Figure 6:
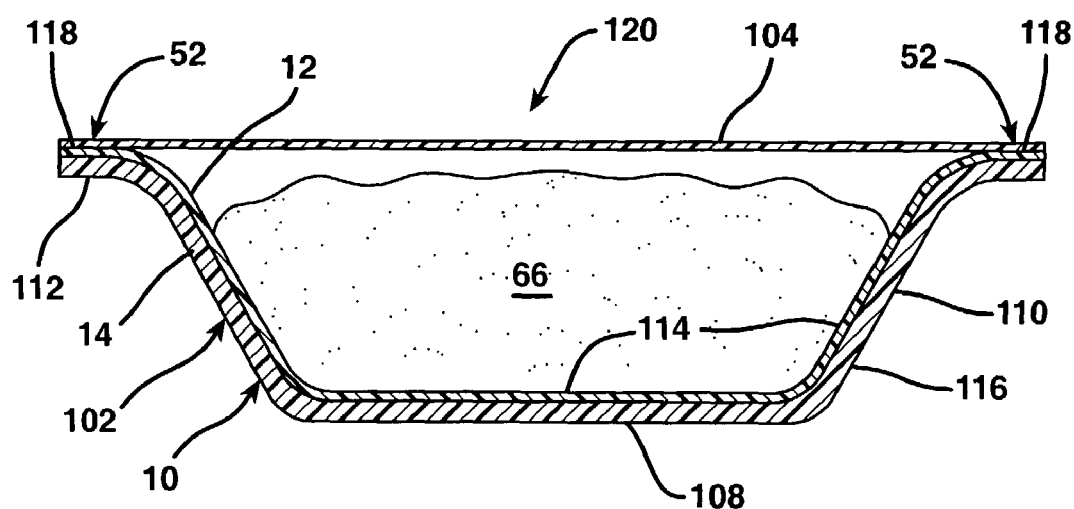
FIG. 6 is a representational sectional view taken along line 6-6 of FIG. 5.

Tray 102 of the present invention may be formed from a sheet including at least two layers: first layer 12 and second layer 14. (FIGS. 5-6.) For two-layer sheet 10 (FIG. 1), first layer 12 forms the first outer surface 16 of the sheet and second layer 14 forms the second outer surface 18 of sheet 10 opposite outer surface 16. For a sheet comprising three or more layers, both the first and second layers 12, 14 may be outer layers forming the outside surfaces of the sheet 20 (FIG. 2) with one or more additional layers 22 between the first and second layers—or the second layer 14 may form an interior layer of the sheet as shown by sheet 30 (FIG. 3) with one or more additional layers 24 oriented to the exterior of second layer 14. For a sheet comprising four or more layers, the second layer 14 may form an interior layer as shown by sheet 40 (FIG. 4) with one or more additional layers 22 between the first and second layers and with one or more additional layers 24 oriented to the exterior of second layer 14.

The sheet may comprise, for example, at least 3 layers, at least 4 layers, at least 5 layers, from 2 to 4 layers, from 2 to 5 layers, and from 5 to 9 layers. As used herein, the term "layer" refers to a discrete sheet component which is coextensive with the sheet and has a substantially uniform composition. Where two or more adjacent layers have essentially the same composition, then these two or more adjacent layers may be considered a single layer for the purposes of this application.

The sheet may have a thickness of at least about any of the following values: 15 mils, 18 mils, 20 mils, 23 mils, 26 mils, and 30 mils. The sheet may have a thickness of less than about any of the following values: 60 mils, 50 mils, 40 mils, 35 mils, 30 mils, and 25 mils.

Figure 1:
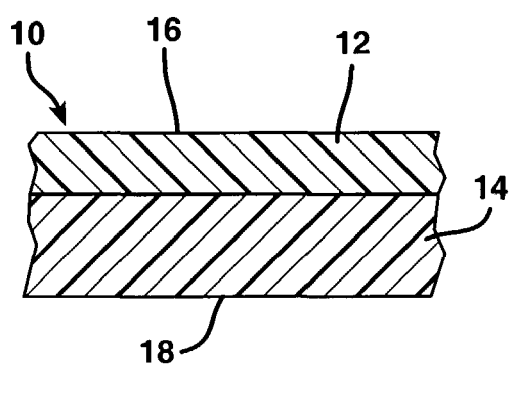
FIG. 1 is a representational cross-section of a two-layer sheet of the present invention.
Figure 2:
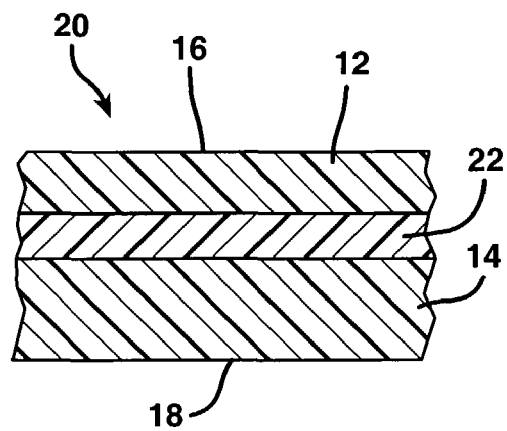
FIG. 2 is a representational cross-section of a sheet of the present invention having at least three layers.
Figure 3:
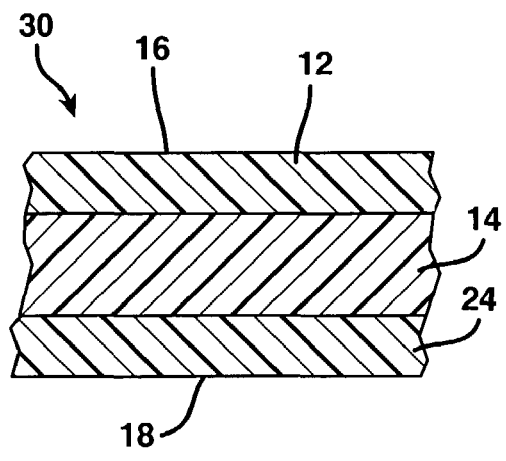
FIG. 3 is a representational cross-section of another sheet of the present invention having at least three layers.

The sheet 10 (or any sheet of the present invention) may be formed into a tray 102, for example, one suitable for packaging a food product. (FIGS. 5-6.) A lid film 104 may be sealed to the tray to form a closed package 120. In forming the closed package, the first layer 12 of the sheet may be sealed to the lid film to form the heat seals 52 of the package. In this manner, the first layer 12 (i.e., the "heat seal layer" or "sealant layer") of the sheet is considered the "inside" or food-side layer of the sheet and the tray made from the sheet. The "outside layer" of the sheet may be second layer 14 (as shown in FIGS. 1-2) or the outside layer may formed by one of the one or more layers 24 (as shown in FIGS. 3-4).

First Layer of the Sheet

The first layer 12 facilitates heat sealing the tray 102 to the lid 104, and accordingly may be considered the sealant layer of the tray.

The sealant layer comprises one or more polyamides. Useful polyamides may include those of the type that may be formed by the polycondensation of one or more diamines with one or more diacids and/or of the type that may be formed by the polycondensation of one or more amino acids. Useful polyamides include aliphatic polyamides and aliphatic/aromatic polyamides.

Representative aliphatic diamines for making polyamides include those having the formula:

where n has an integer value of 1 to 16. Representative examples include trimethylenediamine, tetramethylenediamine, pentamethylenediamine, hexamethylenediamine, octamethylenediamine, decamethylenediamine, dodecamethylenediamine, and hexadecamethylenediamine. Representative aromatic diamines include p-phenylenediamine, 4,4'-diaminodiphenyl ether, 4,4' diaminodiphenyl sulphone, 4,4'-diaminodiphenylethane. Representative alkylated diamines include 2,2-dimethylpentamethylenediamine, 2,2,4-trimethylhexamethylenediamine, and 2,4,4 trimethylpentamethylenediamine. Representative cycloaliphatic diamines include diaminodicyclohexylmethane. Other useful diamines include heptamethylenediamine, nonamethylenediamine, and the like.

Representative diacids for making polyamides include dicarboxylic acids, which may be represented by the general formula:

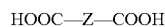

where Z is representative of a divalent aliphatic radical containing at least 2 carbon atoms. Representative examples include adipic acid, sebacic acid, octadecanedioic acid, pimelic acid, suberic acid, azelaic acid, dodecanedioic acid, and glutaric acid. The dicarboxylic acids may be aliphatic acids, or aromatic acids such as isophthalic acid and terephthalic acid.

The polycondensation reaction product of one or more or the above diamines with one or more of the above diacids may form useful polyamides. Representative polyamides of the type that may be formed by the polycondensation of one or more diamines with one or more diacids include aliphatic polyamides such as poly(hexamethylene adipamide) ("nylon-6,6"), poly(hexamethylene sebacamide) ("nylon-6,10"), poly(heptamethylene pimelamide) ("nylon-7,7"), poly(octamethylene suberamide) ("nylon-8,8"), poly(hexamethylene azelamide) ("nylon-6,9"), poly(nonamethylene azelamide) ("nylon-9,9"), poly(decamethylene azelamide) ("nylon-10,9"), poly(tetramethylenediamine-co-oxalic acid) ("nylon-4,2"), the polyamide of n-dodecanedioic acid and hexamethylenediamine ("nylon-6,12"), the polyamide of dodecamethylenediamine and n-dodecanedioic acid ("nylon-12,12").

Representative aliphatic/aromatic polyamides include poly(tetramethylenediamine-co-isophthalic acid) ("nylon-4, I"), polyhexamethylene isophthalamide ("nylon-6,I"), poly (2,2,2-trimethyl hexamethylene terephthalamide), poly(m-xylylene adipamide) ("nylon-MXD,6"), poly(p-xylylene adipamide), poly(hexamethylene terephthalamide), poly (dodecamethylene terephthalamide), and polyamide-MXD,I.

Representative polyamides of the type that may be formed by the polycondensation of one or more amino acids include poly(4-aminobutyric acid) ("nylon-4"), poly(6-aminohexanoic acid) ("nylon-6" or "poly(caprolactam)"), poly(7-aminoheptanoic acid) ("nylon-7"), poly(8-aminooctanoic acid) ("nylon-8"), poly(9-aminononanoic acid) ("nylon-9"), poly (10-aminodecanoic acid) ("nylon-10"), poly(11-aminoundecanoic acid) ("nylon-11"), and poly(12-aminododecanoic acid) ("nylon-12").

Representative copolyamides include copolymers based on a combination of the monomers used to make any of the foregoing polyamides, such as, nylon-4/6, nylon-6/6, nylon-6/9, caprolactam/hexamethylene adipamide copolymer ("nylon-6,6/6"), hexamethylene adipamide/caprolactam copolymer ("nylon-6/6,6"), trimethylene adipamide/hexamethylene azelaiamide copolymer ("nylon-trimethyl 6,2/6,2"), hexamethylene adipamide-hexamethylene-azelaiamide caprolactam copolymer ("nylon-6,6/6,9/6"), hexamethylene adipamide/hexamethylene-isophthalamide ("nylon-6,6/6,I"), hexamethylene adipamide/hexamethyleneterephthalamide ("nylon-6,6/6,T"), nylon-6,T/6,I, nylon-6/MXD,T/MXD,I, nylon-6,6/6,10, and nylon-6,I/6,T.

Conventional nomenclature typically lists the major constituent of a copolymer before the slash ("/") in the name of a copolymer; however, in this application the constituent listed before the slash is not necessarily the major constituent unless specifically identified as such. For example, unless the application specifically notes to the contrary, "nylon-6/6,6" and "nylon-6,6/6" may be considered as referring to the same type of copolyamide.

Polyamide copolymers may include the most prevalent polymer unit in the copolymer (e.g., hexamethylene adipamide as a polymer unit in the copolymer nylon-6,6/6) in mole percentages ranging from any of the following: at least about 50%, at least about 60%, at least about 70%, at least about 80%, and at least about 90%, and the ranges between any of the forgoing values (e.g., from about 60 to about 80%); and may include the second most prevalent polymer unit in the copolymer (e.g., caprolactam as a polymer unit in the copolymer nylon-6,6/6) in mole percentages ranging from any of the following: less than about 50%, less than about 40%, less than about 30%, less than about 20%, less than about 10%, and the ranges between any of the forgoing values (e.g., from about 20 to about 40%).

Useful polyamides include those that are approved by the controlling regulating agency (e.g., the U.S. Food and Drug Agency) for either direct contact with food and/or for use in a food packaging film or sheet, at the desired conditions of use.

The sealant layer may comprise one or more polyamides in an amount of any of the following ranges based on the weight of the sealant layer: at least about 70%, at least about 80%, at least about 90%, at least about 95%, at least about 96%, and at least about 98%. Further, the sealant layer may comprise about 100% polyamide, may consist of one or more polyamides, or may consist essentially of one or more polyamides.

The sealant layer may comprise more than one polyamide such as a blend of polyamides, for example, two polyamides, at least two polyamides, three polyamides, and at least three polyamides. The sealant layer may comprise a first polyamide in any of the following amounts (based on the weight of the sealant layer): at least about 40%, at least about 50%, at least about 60%, at least about 70%, at least about 80%, at least about 90%, at least about 95%, and the ranges between any of these forgoing values (e.g., from about 60 to about 80%).

The sealant layer may comprise a second polyamide in any of the following amounts (based on the weight of the sealant layer): less than about 60%, less than about 50%, less than about 40%, less than about 30%, less than about 20%, less than about 10%, and less than about 5%, and the ranges between any of these forgoing values (e.g., from about 20 to about 40%).

The sealant layer may comprise a third polyamide in any of the following amounts (based on the weight of the sealant layer): less than about 60%, less than about 50%, less than about 40%, less than about 30%, less than about 20%, less than about 10%, and less than about 5%, and the ranges between any of these forgoing values (e.g., from about 20 to about 40%).

Each of the first, second, and third polyamides of the sealant layer may be selected from any of the polyamides described above, for example, nylon-6, nylon-6,6, nylon-6, 12, nylon-6,6/6,10, and nylon-6,I/6,T. The sealant layer may comprise at least one of nylon-6 and nylon-6,6. The sealant layer may comprise, for example, any of the following combinations: nylon-6 and nylon-6,6/6,10; nylon-6 and nylon-6, I/6,T; nylon-6,6 and nylon-6,12; nylon-6, nylon-6,6/6,10, and nylon-6,I/6,T; and nylon-6, nylon-6,12, and nylon-6,I/6,T.

To facilitate heat sealing at polyolefin-type sealing conditions (as discussed in the Background section) the sealant layer 12 may have a softening characteristic such that a representative sample of the sheet that is heat sealed together with a 1.0 mil mono-layer film of 50 weight % nylon-6 and 50 weight % nylon-6,6 (with the sealant layer of the sheet facing the film)—using a ⅛-inch wide sealing bar at a temperature selected from 290° F. and 300° F., a dwell time of 0.5 seconds, and a sealing pressure of 40 psig—forms a heat seal having a seal strength of at least about any of the following: 1 pound/ inch, 2 pound/inch, 2.5 pound/inch, 3 pounds/inch, 3.5 pound/inch, and 4 pounds/inch. The term "seal strength of a heat seal" (or similar term) as used herein means the maximum amount of force (pounds/inch) required to for separation or delamination, as measured in accordance with ASTM F88-94 where the Instron tensile tester crosshead speed is 5 inches per second, using five, 1-inch wide, representative samples.

The sealant layer may have a melting point less than about any of the following values: 220° C., 210° C., 200° C., 190° C., and 180° C.; and the melting point of the sealant layer may be at least about any of the following values: 120° C., 130° C., 140° C., and 150° C. All references to the melting point of a polymer, a resin, or a layer in this application refer to the melting peak temperature of the dominant melting phase of the polymer, resin, or layer as determined by differential scanning calorimetry according to ASTM D-3418.

If the sealant layer comprises amorphous material, then the sealing layer may not clearly display a melting point. The glass transition temperature for the sealing layer may be less than about, and may range between about, any of the following values: 125° C., 120° C., 110° C., 100° C., 90° C., 80° C., 70° C., 60° C., and 50° C.; measured where the relative humidity may be any the following values: 100%, 75%, 50%, 25%, and 0%. All references to the glass transition temperature of a polymer, a resin, or a layer in this application refer to the characteristic temperature at which glassy or amorphous polymers become flexible as determined by differential scanning calorimetry (DSC) according to ASTM D-3417.

The sealant layer may comprise a polyamide blend comprising one or more relatively high-melting point polyamides with one or more relatively low-melting point polyamides. The sealant layer may comprise such a polyamide blend in at least about any of the following amounts based on the weight of the sealant layer: 70%, 80%, 90%, and 95%. The relatively high-melting point polyamides may have a melting point of at least about any of the following values: 210° C., 215° C., 220° C., 225° C., 230° C., 235° C., 240° C., 245° C., 250° C., 255° C., 260° C., 265° C., 270° C., 275° C., 280° C., 285° C., 290° C., 295° C., and 300° C.; and may range between any of the forgoing values (e.g., from about 235 to about 280° C.). Representative relatively high-melting point polyamides may include nylon-6, nylon-6,6, nylon-6/6,6, nylon-6,10, nylon-6,12, nylon-6/6,T, nylon-MXD,6, nylon-4,6, nylon-6,9, and nylon-6,6,/6,10 (having less than about 10% or more than about 60% nylon-6,6 in the copolymer).

The relatively low-melting point polyamides may have a melting point of less than about any of the following values: 210° C., 205° C., 200° C., 195° C., 190° C., 185° C., and 180° C., Representative relatively low-melting point polyamides may include nylon-6/12, nylon-12, nylon-12,T, nylon-6/6,9, nylon-11, and nylon-6,6,/6,10 (having from about 10% to about 60% nylon-6,6 in the copolymer).

The amount of relatively high-melting point polyamide in the polyamide blend of relatively high-melting point polyamide with relatively low-melting point polyamide may be at least about, may be less than about, and may range between about any of the following amounts (based on the weight of the blend): 1%, 5%, 10%, 20%, 30%, 40%, and 50%. The amount of relatively low-melting point polyamide in the blend of relatively high-melting point polyamide with relatively low-melting point polyamide may be at least about, may be less than about, and may range between about any of the following amounts (based on the weight of the blend): 50%, 60%, 70%, 80%, 90%, 95%, and 99%.

The sealant layer may comprise a polyamide blend comprising a first relatively high-melting point polyamide with a second relatively high-melting point polyamide. The sealant layer may comprise such a polyamide blend in at least about any of the following amounts based on the weight of the sealant layer: 70%, 80%, and 90%.

The sealant layer may comprise a blend of two or more polyamides where each polyamide of the blend has a melting point higher than the melting point of the blend, for example, where the melting point range for the blend includes any of the melting point ranges as set forth for the sealant layer above.

The sealant layer may comprise one or more amorphous polyamides, for example, nylon-6,I/6,T. The sealant layer may comprise amorphous polyamide in an amount at least about, at most about, and ranging between about any of the following values (based on the weight of the sealant layer): 20%, 30%, 40%, 50%, 60%, 70%, and 80%.

The thickness of sealant layer 12 is selected to provide sufficient material to effect a strong heat seal bond, yet not so thick so as to negatively affect the ovenable characteristics of the sheet to an unacceptable level. The sealant layer may have a thickness of at least about any of the following values: 0.05 mils, 0.1 mils, 0.15 mils, 0.2 mils, 0.25 mils, 0.3 mils, 0.35 mils, 0.4 mils, 0.45 mils, 0.5 mils, and 0.6 mils. The sealant layer may have a thickness less than about any of the following values: 10 mils, 5 mils, 4 mils, 3 mils, 2 mils, 1 mil, 0.7 mils, 0.5 mils, and 0.3 mils. The thickness of the sealant layer as a percentage of the total thickness of the sheet may be less that about any of the following values: 50%, 40%, 30%, 25%, 20%, 15%, 10%, and 5%; and may range between any of the forgoing values (e.g., from about 10% to about 30%).

Second Layer of the Sheet

The second layer 14 may comprise one or more polyamides such as any of those discussed above in any of the following amounts based on the weight of the second layer: at least about 70%, at least about 80%, at least about 90%, at least about 95%, at least about 96%, and at least about 98%. Further, the second layer may comprise about 100% polyamide, may consist of one or more polyamides, or may consist essentially of one or more polyamides.

The second layer may comprise more than one polyamide such as a blend of polyamides, for example, two polyamides, at least two polyamides, three polyamides, and at least three polyamides. The second layer may comprise a first polyamide of at least about, and between about, any of the following amounts (based on the weight of the second layer): 60%, 70%, 80%, and 90%. The second layer may comprise a second polyamide of less than about, and between about, any of the following amounts (based on the weight of the second layer): 50%, 40%, 30%, 20%, and 10%.

Each of the first and second polyamides of the second layer may be selected from, for example, nylon-6, nylon-6,6, nylon-6/6,6, nylon-6,10, nylon-6,12, nylon-6,6/6,10, nylon-6/6,T, nylon-MXD,6, and nylon-4,6. The second layer may comprise any of nylon-6, nylon-6,6, and nylon-6/6,6, and combinations thereof, such as both nylon-6 and nylon-6,6.

The second layer may comprise one or more amorphous polyamides, for example, nylon-6,I/6,T. The second layer may comprise amorphous polyamide in an amount at least about, at most about, and ranging between about any of the following values (based on the weight of the second layer): 10%, 20%, 30%, 40%, 50%, 60%, 70%, and 80%.

To enhance the high-temperature performance of the sheet, the second layer 14 may have a melting point of at least about any of the following values: 210° C., 220° C., 230° C., 240° C., 250° C., 260° C., 270° C., 280° C., 290° C., and 300° C.; and may range between any of forgoing values.

The glass transition temperature for the second layer may be less than about, and may range between, any of the following values: 125° C., 120° C., 110° C., 100° C., 90° C., 80° C., 70° C., 60° C., and 50° C.; measured where the relative humidity may be any of the following values: 100%, 75%, 50%, 25%, and 0%.

The second layer may have a melting point greater than the melting point of the sealant layer by at least about any of the following values: 20° C., 30° C., 40° C., 50° C., 60° C., 70° C., 80° C., 90° C., and 100° C.

The second layer may comprise a polyamide blend comprising two or more relatively high-melting point polyamides, such as those discussed above with respect to the sealant layer.

The amount of relatively high-melting point polyamide in the polyamide blend of the second layer may be at least about, and may range between, any of the following amounts (based on the weight of the blend): 70%, 80%, 90%, 95%, 100%.

The thickness of second layer 14 may be selected to provide sufficient material to enhance the ovenable characteristics of the sheet. The second layer may have a thickness of at least about any of the following values: 0.5 mils, 0.75 mils, 1 mil, 2 mils, 3 mils, 4 mils, 5 mils, 10 mils, 15 mils, 20 mils, 25 mils, and 30 mils. The second layer may have a thickness less than about any of the following values: 40 mils, 35 mils, 30 mils, 25 mils, 20 mils, 15 mils, 10 mils, 6 mils, 5 mils, 4 mils, and 3 mils. The thickness of the second layer as a percentage of the total thickness of the sheet may be at least about any of the following values: 40%, 50%, 60%, 70%, 80%, and 90%; and may range between any of the forgoing values (e.g., from about 40% to about 90%).

Other Layers of the Sheet

The sheet may include one or more additional layers 22, 24. The additional layers may comprise any of the materials, and in any of the amounts, discussed above with respect to the first and second layers. Also, one or more of the additional layers may comprise a cellulose-based material, for example, paper.

The additional layers 22, 24 may comprise one or more barrier components. Useful barrier components include: ethylene/vinyl alcohol copolymer ("EVOH"), polyacrylonitrile ("PAN"), and polyamide, for example, nylon-MXD,6 (either with or without nanocomposite), nylon-MXD,6/MXD,I.

EVOH may have an ethylene content of, for example, between about 20% and 45%, between about 25% and 35%, and 32% by weight. EVOH may include saponified or hydrolyzed ethylene/vinyl acetate copolymers, such as those having a degree of hydrolysis of at least 50%, preferably of at least 85%. EVOH may be a retortable grade EVOH, such as those available from Nippon Goshei.

The additional layer comprising a barrier component may have a thickness and composition sufficient to impart to the sheet incorporating the barrier layer an oxygen transmission rate of no more than about any of the following values: 150, 100, 50, 45, 40, 35, 30, 25, 20, 15, 10, and 5 cubic centimeters (at standard temperature and pressure) per square meter per day per 1 atmosphere of oxygen pressure differential measured at 0% relative humidity and 23° C. All references to oxygen transmission rate in this application are measured at these conditions according to ASTM D-3985.

An additional layer may comprise barrier component in an amount of at least about any of the following: 50%, 60%, 70%, 80%, 90%, and 100%, based on the weight of the additional layer comprising the barrier component. The thickness of an additional layer may be any of the following: from about 0.05 to about 6 mils, from about 0.05 to about 4 mils, from about 0.1 to about 3 mils, and from about 0.12 to 2 mils.

Additives

Either or both of the layers 12 and 14—or any of the polyamide resins or blends—may comprise effective amounts of one or more nucleating agents. Effective amounts and types of nucleating agents are known to those of skill in the art.

Either or both of the layers 12 and 14—or any of the polyamide resins or blends—may comprise effective amounts of one or more nanocomposite clay materials. Effective amounts and types of nanocomposite agents are known to those of skill in the art.

Either or both of the layers 12 and 14—or any of the polyamide resins or blends—may comprise effective amounts of one or more heat stabilizers. Effective amounts and types of heat stabilizers are known to those of skill in the art, and include, for example, those available under the Solutia NA-189 trademark and the Honeywell MB-HS trademark. The layer may comprise at least about any of the following amounts of heat stabilizer: 0.2%, 0.5%, 0.8%, 1%, 1.3%, 1.5%, 2%, 2.5%, 3%, 4%, and 5%, and may range between any of those values (e.g., from about 0.5% to about 3%).

One of more of the layers 12, 14, 22, 24 may include one or more additives useful in packaging sheets, such as, antiblocking agents, slip agents, antifog agents, colorants, pigments, dyes, flavorants, antimicrobial agents, meat preservatives, antioxidants, fillers, radiation stabilizers, and antistatic agents. Such additives, and their effective amounts, are known in the art.

The Sheet

The sheet 10, 20, 30, 40 may be capable of forming a heat seal with a lid film under "polyolefin-type" heat seal conditions where the heat seals have a seal strength that can withstand the expected conditions of use in microwave and conventional ovens, for example, exposure of three or four hours in an oven having an air temperature of 300° F., 350° F., or 400° F. without failure (e.g., delamination) of the heat seal.

The sheet and/or tray of the present invention may comprise one or more polyamides in an amount of any of the following ranges based on the weight of the sheet: at least about 70%, at least about 80%, at least about 90%, at least about 95%, at least about 96%, and at least about 98%. Further, the sheet and/or tray may comprise about 100% polyamide, may consist of one or more polyamides, or may consist essentially of one or more polyamides.

The sheet and/or tray of the present invention may comprise less than about any of the following amounts of polyolefin (based on the weight of the sheet): 20%, 15%, 10%, 5%, 3%, 2%, and 1%; and the amount of polyolefin in the sheet may range between any two of these values (e.g., from about 2% to about 15%). The sheet and/or tray may be substantially free of polyolefin.

The sheet and/or tray of the present invention may comprise less than about any of the following amounts of polyester (based on the weight of the sheet and/or film): 20%, 15%, 10%, 5%, 3%, 2%, and 1%; and the amount of polyester in the sheet may range between any two of these values (e.g., from about 2% to about 15%). The sheet and/or tray may be substantially free of polyester.

The sheet and/or tray of the present invention may be transparent (at least in the non-printed regions) so that the packaged article is visible through the sheet. "Transparent" as used herein means that the material transmits incident light with negligible scattering and little absorption, enabling objects (e.g., packaged food or print) to be seen clearly through the material under typical unaided viewing conditions (i.e., the expected use conditions of the material). The transparency (i.e., clarity) may be at least about any of the following values: 20%, 25%, 30%, 40%, 50%, 65%, 70%, 75%, 80%, 85%, and 95%, as measured in accordance with ASTM D1746. All references to "transparency" values in this application are by this standard.

The transparency of the sheet and/or tray may be measured before and after the sheet has been exposed in a conventional oven at 400° F. (air temperature) for an amount of time selected from 3 hours and 4 hours. After removal from the oven and cooling to room temperature, representative samples may be taken. The transparency and haze of the sheet and/or tray before and after this exposure may remain substantially the same—for example, the transparency may not have decreased by more than 5% points (e.g., from a 95% transparency to a 90% transparency) and the haze may not have increased by more than 5% points (e.g., from 10% haze to 15% haze).

The sheet may be manufactured by thermoplastic sheet-forming processes known in the art (e.g., coextrusion, extrusion coating, flat or cast film extrusion). A combination of these processes may also be employed.

Tray

A tray useful for supporting a food product may be formed by thermoforming a sheet to a desired shape. The tray may comprise any of the above described sheets. Methods of thermoforming sheets comprising thermoplastic material to form trays are well known in the art and are therefore not discussed in detail here.

FIGS. 5-6 illustrate one tray configuration of the present invention. Tray 102 may include a base 108 with one or more walls 110 extending from the base 108. The base and one or more walls comprise sheet 10, and define a tray inside surface 114 and a tray outside surface 116. The tray inside surface 114 may be adapted to support a food product 66. The first layer 12 of the sheet 10 may form the tray inside surface 114.

The tray 102 may include a perimeter flange 112 extending from the one or more walls 110. The first layer 12 of the sheet may form heat seal surface 118 of the flange 112.

The tray may have a shape or configuration other than specifically illustrated in the drawings, for example, the tray may have a bowl shape or walls of relatively low or little rise compared to the base. A wall comprising the sheet may include the tray structure that extends and deviates from the relatively planar base comprising the sheet.

Any of the base 108, one or more walls 110, and flange 112 may have any of the thicknesses recited above with respect to the sheet. The thickness of a layer, sheet, base, wall, and the like may be taken as an average value across a representative section.

Package

Lid film 104 may be sealed to tray 102 to form closed package 120, which may enclose a product, for example food product 66 supported by base 108 and optionally one or more walls 110. (FIGS. 5-6.) For example, lid 104 may be heat sealed to heat seal surface 118 of perimeter flange 112 to form heat seals 52. Since first layer 12 of the sheet from which tray 102 is formed may also form heat seal surface 118, lid film 104 may be sealed directly to first layer 12 of the tray. The layer of the lid film 104 contacting first layer 12 to form the heat seal 52 may have a melting point greater than the melting point of first layer 12, for example, greater by at least about any of the following values: 5° C., 10° C., 15° C., 20° C., 25° C., and 30° C. Heat sealing may occur by one or more of thermal conductance heat sealing, impulse sealing, ultrasonic sealing, and dielectric sealing.

The lid film may be heat sealed to the tray under "polyolefin-type" heat seal conditions, yet the heat seals 52 have a seal strength that can withstand the expected conditions of use in microwave and conventional ovens, for example, exposure of three or four hours in an oven having an air temperature of about 300° F., 350° F., or 400° F. without failure (e.g., delamination) of the heat seal. Examples of "polyolefin-type" heat seal conditions for sealing a lid to a tray include a sealing bar temperature of from about 280° F. to about 380° F. (e.g., from about 290° F. to about 300° F. or from about 330° F. to about 360° F.), a dwell time of from about 0.2 seconds to about 1 second (e.g., from about 0.4 to about 0.7 seconds, and about 0.5 seconds), and a sealing pressure of from about 30 psig to about 100 psig (e.g., from about 40 psig to about 80 psig, about 40 psig, and about 80 psig).

Useful lid films include plastic films that may be dual ovenable without significant deterioration of desired performance and appearance characteristics. The lid film may comprise one or more of any of the above-discussed polyamides. For example, the lid film may comprise one or more of nylon-6, nylon-6,6, and nylon-6/6,6. Further, the lid film may comprise or consist essentially of any of the compositions or characteristics discussed above with respect to second layer 14 of the sheet. The lid film may include one or more polyamides in at least about any of the following amounts, based on the weight of the lid film: 70%, 80%, 90%, 95%, and 100%. The lid film may include one or more polyesters in at least about any of the following amounts, based on the weight of the lid film: 70%, 80%, 90%, 95%, and 100%. Useful polyesters may include polyethylene terephthalate and polybutylene terephthalate. Useful lid film may also include any of the films disclosed in U.S. patent application Ser. No. 10/228,515 filed Aug. 27, 2002 entitled "Dual-Ovenable, Heat-Sealable Packaging Film" by Berrier and Ebner, which is incorporated herein in its entirety by reference.

The thickness of the lid film (taken as an average across a representative section) may be less than about any of the following values: 15 mils, 12 mils, 9 mils, 6 mils, and 4 mils. The thickness of the lid film may also be at least about any of the following values: 0.5 mils, 1 mil, 1.5 mils, and 2 mils.

Figure 7:
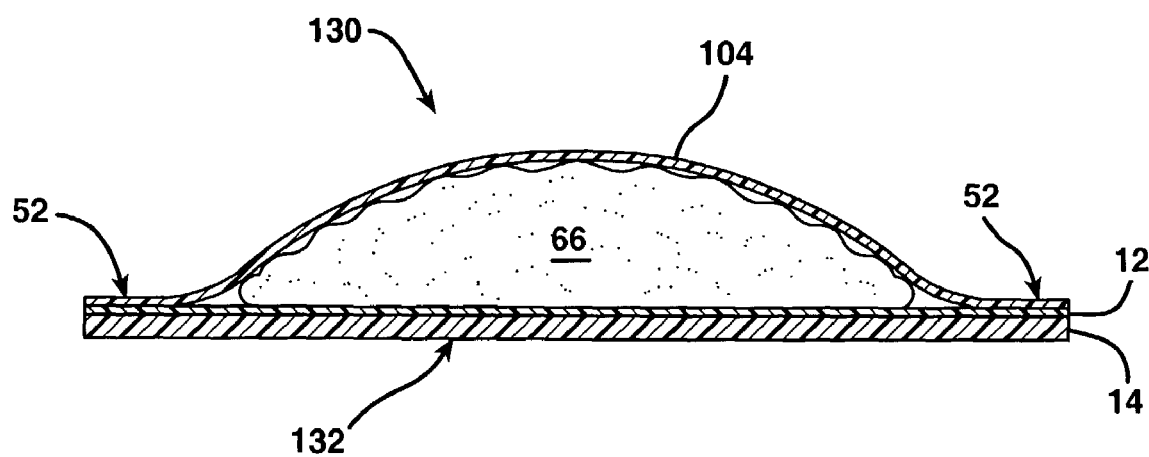
FIG. 7 is a representational sectional view of a package comprising a sheet of the present invention.

In another packaging configuration, lid film 104 may be sealed to essentially planar sheet 132 to form package 130 enclosing product 66 supported by planar sheet 132. (FIG. 7.) Planar sheet 132 may comprise or consist essentially of any of the sheets discussed above. Lid 104 may be heat sealed directly to first layer 12 at selected regions of the sheet to enclose product 66 between the lid 104 and sheet 132.

The package (e.g., package 120 and package 130) may be used in packaging an article or object, for example, packaging food, where the food packaging may be exposed to microwave or conventional oven conditions or both (i.e., dual ovenable) to heat or cook the food. Such food may comprise for example, fresh, raw, partially-cooked, or cooked food, such as red meat products (e.g., beef, veal, lamb, and pork), poultry, and pre-prepared products such as pizza and pasta.

Any of the above-described food may be enclosed in a package comprising the tray or sheet of the present invention as described above. The food may then be heated, reheated, or cooked by placing the food enclosed in the package in an oven and activating the oven to heat or cook the food enclosed in the package to a desired level.

The following examples are presented for the purpose of further illustrating and explaining the present invention and are not to be taken as limiting in any regard. Unless otherwise indicated, all parts and percentages are by weight.

In the following examples these abbreviations may be used:

"PA1-6" is a nylon-6 having a melting point of 220° C. available from BASF Corporation (Parsippany, N.J.) under the Ultramid B4 trademark.

"PA1-6,6" is a nylon-6,6 having a melting point of 264° C. available from Solutia Corporation (Pensacola, Fla.) and supplied by Prime Alliance (Des Moines, Iowa) under the ASCEND 66J trademark.

"PA1-6,6/6,10" is a nylon-6,6/6,10 having a melting point of 200° C. available from EMS Corporation (Sumter, S.C.) under the Grilon BM20SBG trademark.

"PA1-6,I/6,T" is an amorphous nylon-6,I/6,T copolymer having a dry glass transition temperature of 125° C. available from Dupont Corporation (Wilmington, Del.) under the Selar 2072 trademark.

"HS" is a heat stabilizer masterbatch available from Solutia Corporation (Pensacola, Fla.) and supplied by Prime Alliance (Des Moines, Iowa) under the NA-189 trade name.

"Black MB" is a master batch available from Clariant Corporation under the Black Nylon Masterbatch trade name.

Examples 1-2

Sheets 1-2 shown in Table 1 below were 35 mil thick sheets made by a cast film extrusion process.

TABLE 1

| | Layer | PA1-6 (wt %) | PA1-6,6 (wt %) | PA1-6,6/6,10 (wt %) | PA1-6,I/6,T (wt %) | HS (wt %) | Black MB (wt %) |
|---|---|---|---|---|---|---|---|
| Sheet 1 | 1st | 24 | | 75 | | 1 | |
| | 2nd | 39 | 58 | | | | 3 |
| Sheet 2 | 1st | 20 | | 59 | 20 | 1 | |
| | 2nd | 39 | 58 | | | | 3 |

Trays were thermoformed from each of Sheets 1 and 2 to form Trays 1 and 2, respectively. The trays had a rectangularly-shaped base of 9 inches by 6.75 inches with four surrounding walls each extending 1.875 inches from the periphery of the base. The base of the trays was about 22 mils thick. A peripheral flange extended from the edge of the wall opposite the base, so that the trays had the general shape as shown in FIG. 5.

The 2-mil thick lid films shown in Table 2 were made by the blown film extrusion process.

TABLE 2

| | Layer | Thickness (mil) | PA1-6 (wt %) | PA1-6,6 (wt %) | PA1-6,6/6,10 (wt %) | PA1-6I,6T (wt %) | HS (wt %) |
|---|---|---|---|---|---|---|---|
| Lid Film 1 | 1st | 0.25 | 24 | | 75 | | 1 |
| | 2nd | 1.5 | 40 | 60 | | | |
| | 3rd | 0.25 | 24 | | 75 | | 1 |
| Lid Film 2 | 1st | 0.25 | 20 | | 59 | 20 | 1 |
| | 2nd | 1.75 | 39.6 | 60 | | | 0.4 |

One of each of Trays 1 and 2 was filled with 100 cc of water. One of each of Trays 1 and 2 was filled with pork roast. One of Tray 2 was filled with chicken. The remaining two of Trays 1 and 2 remained empty of product (but full of ambient air). The layer 1 of each of the Lid Film 1 was placed in contact with and heat sealed with layer 1 of each of Tray 1—and layer 1 of each of the Lid Film 2 was placed in contact with and heat sealed with layer 1 of each of Tray 2—in the flange area of the tray to form seven closed packages (generally as shown in FIG. 5). The seals were formed at 80 psig sealing pressure for a 1 second dwell time using a Ross Inpack Model 3320 machine with a sealing temperature setting of about 350° F.

Each of the resulting seven closed packages were placed in an oven having an air temperature of 400° F. for a duration of from 3 to 4 hours. The observed results are shown in Table 3. The integrity of the heat seals of each of the resulting closed packages were maintained after this exposure without delamination or other failure, demonstrating the surprising result that the closed lid/tray packages formed with heat seals made at "polyolefin type of heat sealing conditions" for lid/tray systems could perform at conventional oven conditions.

TABLE 3

| | Enclosed Item: | | | |
|---|---|---|---|---|
| | Air | Water | Pork | Chicken |
| Tray 1/ Lid Film 1 | Slight yellowing of lid film. | No observed effects on tray or lid film. | No observed effects on tray or lid film. | N/A |
| Tray 2/ Lid Film 2 | No observed effects on tray or lid film. | No observed effects on tray or lid film. | No observed effects on tray or lid film. | No observed effects on tray or lid film. |

"N/A" means not applicable (e.g., the test was not conducted).

The above descriptions are those of preferred embodiments of the invention. Various alterations and changes can be made without departing from the spirit and broader aspects of the invention as defined in the claims, which are to be interpreted in accordance with the principles of patent law, including the doctrine of equivalents. Except in the claims and the specific examples, or where otherwise expressly indicated, all numerical quantities in this description indicating amounts of material, reaction conditions, use conditions, molecular weights, and/or number of carbon atoms, and the like, are to be understood as modified by the word "about" in describing the broadest scope of the invention. Any reference to an item in the disclosure or to an element in the claim in the singular using the articles "a," "an," "the," or "said" is not to be construed as limiting the item or element to the singular unless expressly so stated. All references to ASTM tests are to the most recent, currently approved, and published version of the ASTM test identified, as of the priority filing date of this application. Each such published ASTM test method is incorporated herein in its entirety by this reference.

What is claimed is:

1. A tray useful for supporting a food product, the tray comprising:
    a base having a thickness of at least about 15 mils; and
    one or more walls extending from the base, wherein:
        the base and the one or more walls define a tray inside surface adapted for supporting the food product; and
        the base and the one or more walls comprise a sheet comprising:
            a first layer comprising one or more polyamides, wherein the first layer of the sheet forms the tray inside surface and the first layer has a melting point; and
            a second layer comprising one or more polyamides, wherein the second layer wherein the tray comprises less than about 20% of polyolefin by weight of the tray has a melting point of at least about 210° C. and at least 20° C. greater than the melting point of the first layer.

2. The tray of claim 1 wherein the first layer comprises at least two polyamides.

3. The tray of claim 1 wherein the first layer comprises at least 70% by weight of the first layer of a blend comprising one or more polyamides having a melting point of at least about 210° C. and one or more polyamides having a melting point of less than about 210° C.

4. The tray of claim 3 wherein the blend comprises at least about 50% by weight of the blend of the one or more polyamides having a melting point of less than about 210° C.

5. The tray of claim 1 wherein the first layer comprises at least 20% amorphous polyamide by weight of the first layer.

6. The tray of claim 1 wherein the first layer comprises at least about 80% of one or more polyamides by weight of the first layer.

7. The tray of claim 1 wherein the first layer comprises less than about 50% of the total thickness of the base of the tray.

8. The tray of claim 1 wherein the first layer comprises two or more polyamides selected from nylon-6, nylon-6,6, nylon-6,6/6,10, nylon-6,12, and nylon-6,I/6,T.

9. The tray of claim 1 wherein the first layer comprises nylon-6, nylon-6,6/6,10, and nylon-6,I/6,T.

10. The tray of claim 1 wherein the second layer comprises at least about 50% of the total thickness of the base of the tray.

11. The tray of claim 1 wherein the second layer comprises at least about 80% of one or more polyamides by weight of the second layer.

12. The tray of claim 1 wherein the second layer comprises one or more polyamides selected from nylon-6, nylon-6,6, and nylon-6/6,6.

13. The tray of claim 1 wherein the tray has an outside surface opposite the tray inside surface and the second layer forms the outside surface of the tray.

14. The tray of claim 1 wherein the tray is capable of forming a heat seal having a seal strength of at least about 4 lbf-in where the heat seal is formed by heat sealing the first layer of the tray to a lid consisting of a 1.0 mil mono-layer film of 50 weight % nylon-6 and 50 weight % nylon-6,6 using a ⅛-inch wide sealing bar at a temperature of 300° F., a dwell time of 0.5 seconds, and a sealing pressure of 40 psig.

15. The tray of claim 1 wherein the tray is substantially free of polyolefin.

16. The tray of claim 1 wherein the tray comprises less than about 20% polyester by weight of the tray.

17. The tray of claim 1 wherein the film tray is substantially free of polyester.

18. A packaged food comprising:
a food; and
a package enclosing the food, wherein the package comprises the tray of claim 1.

19. The tray of claim 1 wherein the tray comprises a third layer comprising ethylene/vinyl alcohol.

20. The tray of claim 1 wherein the first layer consists essentially of one or more polyamides.

21. The tray of claim 1 wherein the melting point of the first layer is less than about 220° C.

22. The tray of claim 1 wherein the tray has an oxygen transmission rate of no more than about 150 cubic centimeters (at standard temperature and pressure) per square meter per day per 1 atmosphere of oxygen pressure differential measured at 0% relative humidity and 23° C.

23. The tray of claim 1 wherein the tray comprises at least about 70 weight % polyamide by weight of the tray.

24. A package comprising:
the tray of claim 1; and
a lid sealed to the tray to form a closed package, wherein the lid comprises a film having a thickness of less than about 15 mils, wherein the film comprises at least 70% by weight of the film of one or more polyamides.

25. A package comprising:
the tray of claim 1; and
a lid sealed to the tray to form a closed package, wherein the lid comprises a film having a thickness of less than about 15 mils, wherein the film comprises at least 70% by weight of the film of one or more polyesters.

26. The tray of claim 1 wherein the sheet is thermoformed to form the one or more walls.

27. The tray of claim 1 wherein the base and the one or more walls further comprise paper.

28. A tray useful for supporting a food product, the tray comprising:
a base having a thickness of at least about 15 mils; and
one or more walls extending from the base, wherein:
the base and the one or more walls define a tray inside surface adapted for supporting the food product; and
the base and the one or more walls comprise a sheet comprising:
a first layer comprising one or more polyamides, wherein the first layer of the sheet forms the tray inside surface and the first layer has a glass transition temperature of less than about 120° C. measured at a 50% relative humidity; and
a second layer comprising one or more polyamides, wherein the second layer has a melting point of at least about 210° C. wherein the tray comprises less than about 20% of polyolefin by weight of the tray.

29. The tray of claim 28 wherein the first layer has a melting point and the melting point of the second layer is at least about 20° F. greater than the melting point of the first layer.

30. The tray of claim 28 wherein the first layer comprises at least two polyamides.

31. The tray of claim 28 wherein the first layer comprises at least 20% amorphous polyamide by weight of the first layer.

32. The tray of claim 28 wherein the first layer comprises at least about 80% of one or more polyamides by weight of the first layer.

33. The tray of claim 28 wherein the first layer comprises less than about 50% of the total thickness of the base of the tray.

34. The tray of claim 28 wherein the first layer comprises nylon-6,I/6,T.

35. The tray of claim 28 wherein the second layer comprises at least about 50% of the total thickness of the base of the tray.

36. The tray of claim 28 wherein the second layer comprises at least about 80% of one or more polyamides by weight of the second layer.

37. The tray of claim 28 wherein the second layer comprises one or more polyamides selected from nylon-6, nylon-6,6, and nylon-6/6,6.

38. The tray of claim 28 wherein the tray has an outside surface opposite the tray inside surface and the second layer forms the outside surface of the tray.

39. The tray of claim 28 wherein the tray is capable of forming a heat seal having a seal strength of at least about 4 lbf-in where the heat seal is formed by heat sealing the first layer of the tray to a lid consisting of a 1.0 mil mono-layer film of 50 weight % nylon-6 and 50 weight % nylon-6,6 using a ⅛-inch wide sealing bar at a temperature of 300° F., a dwell time of 0.5 seconds, and a sealing pressure of 40 psig.

40. The tray of claim 28 wherein the tray is substantially free of polyolefin.

41. The tray of claim 28 wherein the tray comprises less than about 20% polyester by weight of the tray.

42. The tray of claim 28 wherein the tray is substantially free of polyester.

43. A packaged food comprising:
a food; and
a package enclosing the food, wherein the package comprises the tray of claim 28.

44. The tray of claim 28 wherein the tray comprises a third layer comprising ethylene/vinyl alcohol.

45. The tray of claim 28 wherein the first layer consists essentially of one or more polyamides.

46. The tray of claim 28 wherein the glass transition temperature of the first layer is less than about 110° C.

47. The tray of claim 28 wherein the tray has an oxygen transmission rate of no more than about 150 cubic centimeters (at standard temperature and pressure) per square meter per day per 1 atmosphere of oxygen pressure differential measured at 0% relative humidity and 23° C.

48. The tray of claim 28 wherein the tray comprises at least about 70 weight % polyamide by weight of the tray.

49. A package comprising:
the tray of claim 28; and
a lid sealed to the tray to form a closed package, wherein the lid comprises a film having a thickness of less than about 15 mils, wherein the film comprises at least about 70% by weight of the film of one or more polyamides.

50. A package comprising:
the tray of claim 28; and
a lid sealed to the tray to form a closed package, wherein the lid comprises a film having a thickness of less than about 15 mils, wherein the film comprises at least about 70% by weight of the film of one or more polyesters.

51. A package for packaging a food product, the package comprising:
a base sheet having a thickness of at least about 15 mils, wherein the base sheet defines a food side surface for supporting the food product, the base sheet comprising:
a first layer comprising one or more polyamides, wherein the first layer of the base sheet forms the food side surface and the first layer has a melting point; and
a second layer comprising one or more polyamides, wherein the second layer has a melting point of at least about 210° C. and at least 20° C. greater than the melting point of the first layer; and a lid film sealed to selected areas of the food side surface of the base sheet to form a closed package, wherein the lid film has a thickness of less than about 15 mils and comprises at least about 70% by weight of the film of one or more polyamides wherein the package comprises less than about 20% of polyolefin by weight of the package.

52. A package for packaging a food product, the package comprising:

a base sheet having a thickness of at least about 15 mils, wherein the base sheet defines a food side surface for supporting the food product, the base sheet comprising:

a first layer comprising one or more polyamides, wherein the first layer of the base sheet forms the food side surface and the first layer has a glass transition temperature of less than about 120° C. measured at a 50% relative humidity; and a second layer comprising one or more polyamides, wherein the second layer has a melting point of at least about 210° C.; and a lid film sealed to selected areas of the food side surface of the base sheet to form a closed package, wherein the lid film has a thickness of less than about 15 mils and comprises at least about 70% by weight of the film of one or more polyamides wherein the package comprises less than about 20% of polyolefin by weight of the package.

* * * * *

UNITED STATES PATENT AND TRADEMARK OFFICE
CERTIFICATE OF CORRECTION

PATENT NO. : 7,919,161 B2  
APPLICATION NO. : 10/322896  
DATED : April 5, 2011  
INVENTOR(S) : Ebner et al.

Page 1 of 1

It is certified that error appears in the above-identified patent and that said Letters Patent is hereby corrected as shown below:

Claim 1, column 14, lines 19 to 21 delete the text "wherein the tray comprises less than about 20% of polyolefin by weight of the tray"

Claim 1, column 14, line 23 after the word layer insert the phrase --wherein the tray comprises less than about 20% of polyolefin by weight of the tray--

Signed and Sealed this  
Fourteenth Day of June, 2011

David J. Kappos  
*Director of the United States Patent and Trademark Office*